US010465560B2

(12) United States Patent
Bickmeier et al.

(10) Patent No.: US 10,465,560 B2
(45) Date of Patent: Nov. 5, 2019

(54) HOUSING ELEMENT FOR AN INTERMEDIATE TURBINE HOUSING

(71) Applicant: MTU Aero Engines AG, Munich (DE)

(72) Inventors: Wolfgang Bickmeier, Petershausen (DE); Petra Kufner, Poing (DE)

(73) Assignee: MTU Aero Engines AG, Munich (DE)

( * ) Notice: Subject to any disclaimer, the term of this patent is extended or adjusted under 35 U.S.C. 154(b) by 362 days.

(21) Appl. No.: 15/426,202

(22) Filed: Feb. 7, 2017

(65) Prior Publication Data
US 2017/0226897 A1 Aug. 10, 2017

(30) Foreign Application Priority Data
Feb. 8, 2016 (DE) .................... 10 2016 201 863

(51) Int. Cl.
*F01D 25/28* (2006.01)
*F01D 25/24* (2006.01)
*F01D 25/16* (2006.01)

(52) U.S. Cl.
CPC .......... *F01D 25/28* (2013.01); *F01D 25/162* (2013.01); *F01D 25/24* (2013.01); *F05D 2220/323* (2013.01); *F05D 2250/72* (2013.01); *F05D 2260/15* (2013.01); *Y02T 50/671* (2013.01)

(58) Field of Classification Search
CPC ........ F01D 25/28; F01D 25/24; F01D 25/162; F01D 25/16; F02C 7/06; F02C 7/20; F05D 2260/94; F05D 2260/941; F05D 2240/14
See application file for complete search history.

(56) References Cited

U.S. PATENT DOCUMENTS

| 5,483,792 | A | * | 1/1996 | Czachor | F01D 25/162 60/796 |
| 6,358,001 | B1 | * | 3/2002 | Bosel | F01D 25/162 411/178 |
| 6,439,841 | B1 | * | 8/2002 | Bosel | F01D 9/065 415/142 |
| 6,860,716 | B2 | * | 3/2005 | Czachor | F01D 25/162 415/142 |
| 9,097,141 | B2 | * | 8/2015 | Paradis | F01D 25/243 |
| 9,498,850 | B2 | * | 11/2016 | Denis | B23K 31/02 |
| 10,100,675 | B2 | * | 10/2018 | Eastwood | F01D 25/243 |
| 10,190,598 | B2 | * | 1/2019 | Veitch | F04D 29/284 |
| 2013/0227930 | A1 | * | 9/2013 | Pegan, Jr. | F01D 9/065 60/224 |

FOREIGN PATENT DOCUMENTS

| DE | 60114696 | 7/2006 |
| EP | 1149986 | 10/2001 |
| EP | 2636855 | 9/2013 |

* cited by examiner

*Primary Examiner* — Dwayne J White
*Assistant Examiner* — Jackson N Gillenwaters
(74) *Attorney, Agent, or Firm* — Davidson, Davidson & Kappel, LLC

(57) ABSTRACT

A housing element (12) for an intermediate turbine housing of a gas turbine, in particular an aircraft gas turbine; the housing element (12) being installable or installed in the intermediate turbine housing radially outwardly, in each case between a plurality of circumferentially spaced struts; the housing element (12) having a planar form and, relative to the radial outer side (16) thereof, a plurality of depressions (18c), is provided. On the radial inner side (32, 34) thereof, the housing element (12) has at least one recess (26) that is configured outside of the regions in which depressions (18c) are formed on the radial outer side (16).

16 Claims, 4 Drawing Sheets

HOUSING ELEMENT FOR AN INTERMEDIATE TURBINE HOUSING

This claims the benefit of German Patent Application DE 10 2016 201 863.9, filed Feb. 8, 2016 and hereby incorporated by reference herein.

The present invention relates to a housing element for an intermediate turbine housing of a gas turbine, in particular an aircraft gas turbine; the housing element being installable or installed in the intermediate turbine housing radially outwardly between a plurality of circumferentially spaced struts; the housing element having a planar form and, relative to the radial outer side thereof, a plurality of depressions.

BACKGROUND

With the assistance of the depressions, such housing elements provide a uniform as possible stress distribution in each instance between two struts, over a cross-sectional profile having a constant surface area over the circumference of an intermediate turbine housing. The required stiffness is thereby mainly determined by the radially outer contour having the plurality of depressions. The depressions may also be considered, in particular, as an integrally formed reinforcement of the housing element.

With regard to achieving a more efficient operation of gas turbines, in particular aircraft gas turbines, it was recognized that the housing elements have a high component weight, which leads to higher levels of specific fuel consumption of the gas turbine in operation.

SUMMARY OF THE INVENTION

It is an object of the present invention to improve a housing element in a way that makes it possible to overcome the above disadvantages.

The present invention provides that the housing element has at least one recess on the radial inner side thereof that is configured outside of the regions in which depressions are formed on the radial outer side.

Such a recess reduces the component weight of the housing element while, at the same time, stiffness is maintained as the radially outer contour having the depressions is unchanged. The inventors discovered that there is no need for a substantially constant material thickness in those regions where no depressions are provided radially outwardly. Rather, there are regions where a reduced material thickness suffices without significantly adversely affecting the requisite stiffness of the housing element.

It is also provided that the depressions be configured to allow a plurality of surfaces to be formed on different levels and joined together via stepped edges in the housing element. In this connection, it may be assumed that it is possible to maintain a sufficient stiffness of the housing element by forming stepped edges, preferably on the radial inner side as well, particularly taking into account that such stepped edges function like reinforcing ribs.

To achieve an altogether favorable stress profile within the housing element, it is preferred that, on the radial inner side, the recess have a circumferential contour that, at least in portions thereof, complements a circumferential contour of a depression formed on the radial outer side.

Preferably at least 30%, more preferably at least 50%, even more preferably at least 70% of the essentially planar housing element is formed by regions where there is either a recess on the radial inner side or a depression on the radial outer side of the housing element. In other words, if one imagined piercing through the housing element in the radial direction relative to the machine axis of the gas turbine, there is a probability of preferably 30%, more preferably of at least 50%, even more preferably of at least 70% of a region being pierced through where the housing element has either a recess on the radial inner side or a depression on the radial outer side. This makes possible a relatively thin and thus weight-optimized design of the housing element; similarly to reinforcing ribs, a substantial stiffness of the housing element being achieved by the reinforcing regions between the regions where the housing element has either a recess on the radial inner side or a depression on the radial outer side.

The cumulative surface area of all regions where the housing element has a recess on the radial inner side preferably corresponds to between 25% and 75% of the cumulative surface area of all regions where the housing element has a depression on the radial outer side. In other words, in terms of cumulative surface area, the depressions and the recess are preferably approximately equal.

In this regard, it is also provided that the circumferential contour of the recess include a plurality of contour portions that merge into one another, the contour portions having a linear or arcuate form. The arcuate contour portions may thereby be designed to be circular arc-shaped, parabolic-shaped or hyperbolic-shaped, allowing a favorable configuration of the contour portions, respectively of the entire circumferential contour for the stress profile.

Since the housing element is to be installed between two struts of the intermediate turbine housing, and both struts transmit the respective stress profiles to the housing element, it is provided that the recess be symmetrically shaped relative to a center axis of the housing element; the center axis preferably being essentially circumferentially disposed in the middle between two struts of the intermediate turbine housing in a state in which the housing element is mounted or integrated on the intermediate turbine housing.

In addition, in a width direction orthogonal to the center axis, the width of the recess may vary along the center axis, preferably continuously. In this regard, it is also provided that the recess have its smallest width value in a region that is approximately 20% of a length thereof, the length being measured along the center axis; the region being preferably configured to include the half-length position.

This width profile along the center line, respectively length of the reinforcing element results in a type of constriction of the circumferential contour of the recess in the middle region thereof. In a plan view, the circumferential contour may also be described as butterfly- or anvil-shaped.

Alternatively, it is also possible that a plurality of recesses be provided that are symmetrically disposed relative to a center axis of the housing element; the center axis preferably being essentially circumferentially disposed in the middle between two struts of the intermediate turbine housing in a state in which the housing element is mounted or integrated on the intermediate turbine housing.

The present invention also relates to an intermediate turbine housing of a gas turbine, in particular an aircraft gas turbine, including a plurality of circumferentially spaced struts that extend radially through a hot gas-conducting annular chamber in a way that allows them to support at least one radially inner hub portion for receiving at least one shaft of the gas turbine; a housing element having at least one of the above features being installed in each case between two struts along the outer circumference of the intermediate turbine housing.

Finally, the present invention also relates to a gas turbine, in particular to an aircraft gas turbine having such an intermediate turbine housing. The intermediate turbine housing is thereby provided with a plurality of circumferentially adjacently disposed housing elements, preferably between a high-pressure turbine and a low-pressure turbine.

BRIEF DESCRIPTION OF THE DRAWINGS

The present invention will be explained exemplarily in the following with reference to the appended figures without being limited thereto.

In a simplified and schematic view.

DETAILED DESCRIPTION

Figure 1:
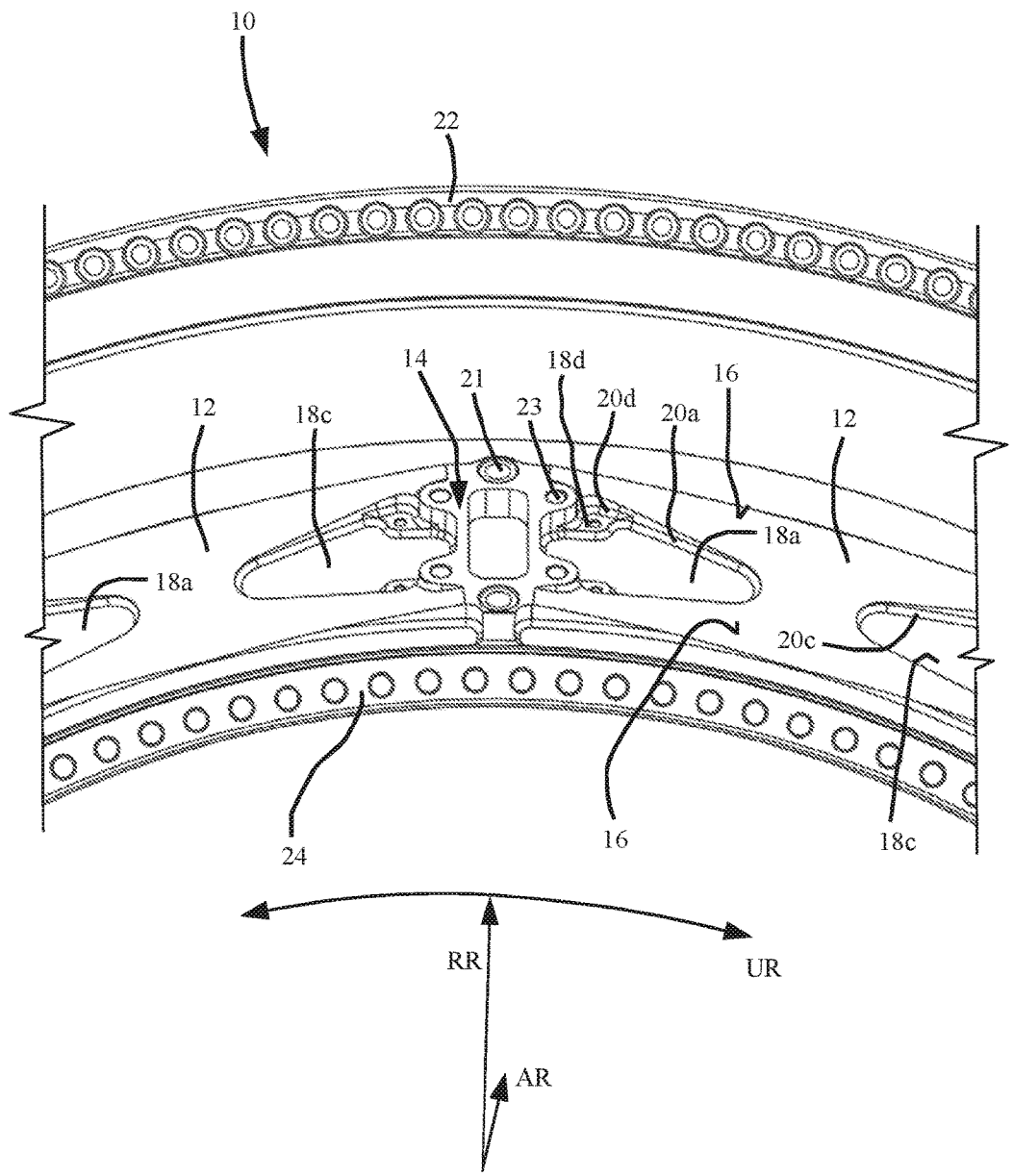
FIG. 1 shows a perspective detail of an intermediate turbine housing having two housing elements extending from a strut-mounting region.

FIG. 1 shows a simplified, perspective detail view of an intermediate turbine housing 10 having two planar housing elements 12. The two housing elements 12 are each shown only partially and extend in circumferential direction UR, starting from a connection region 14, where housing elements 12 are joined to a strut that extends inwardly (See FIG. 3B), starting from connection region 14, essentially in radial direction RR. A plurality of such struts are spaced in circumferential direction UR of intermediate turbine housing 10. A housing element 12 is provided in each case between two such struts, respectively between two connection regions 14. AR characterizes the axial direction of the intermediate turbine housing.

The directional indications "axial," "radial," and "circumferential" are always relative to the machine axis of the gas turbine, unless otherwise explicitly or implicitly derived from the context.

Extending from an outer surface 16, housing element 12 has a plurality of depressions 18a, 18c and 18d; respective stepped edges 20a, 20c, 20d forming the transition from outer surface 16 to a depression 18a, 18c, 18d or from a depression 18d to a further depression 18a. Individually or collectively, edges or transitions 20a, 20c, 20d form a respective circumferential contour for a depression 18a, 18c, 18d.

Figure 3A:
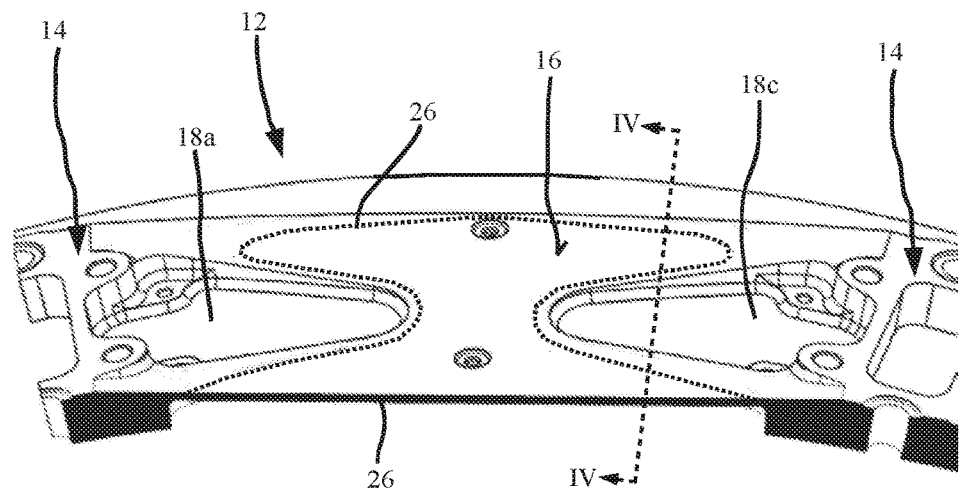
FIGS. 3A and 3B show simplified, perspective part sectional views of the housing element of FIGS. 2A and 2B in an oblique, (axially) frontal plan view, externally (FIG. 3A) and internally (FIG. 3B).
Figure 3B:
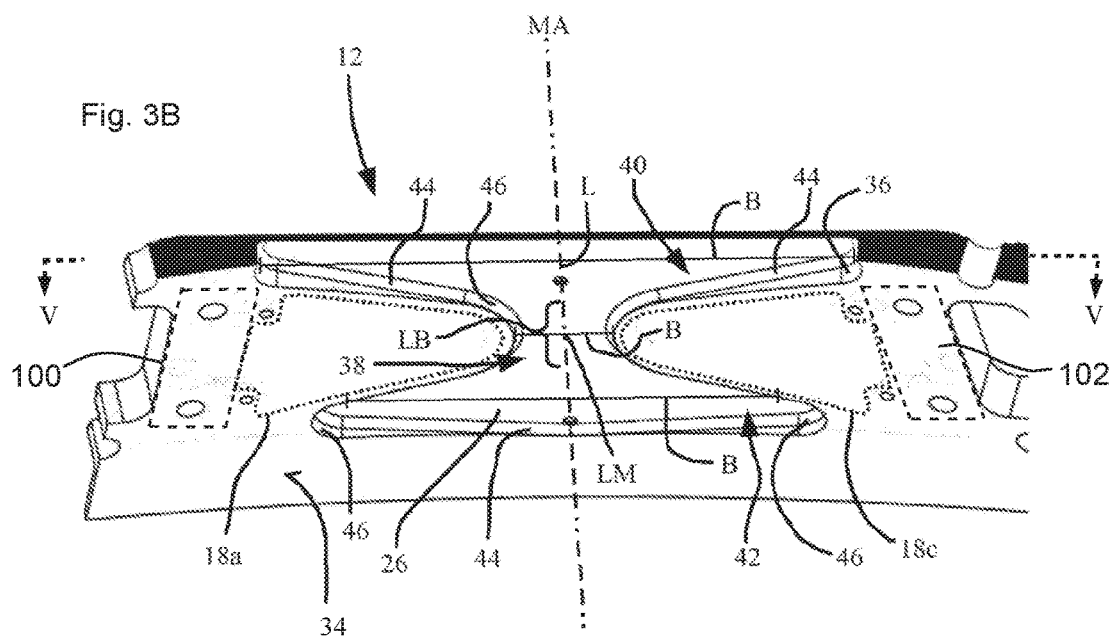

In connection regions 14, housing elements 12 are connected by various fastening means, in particular by bolt connections 21 to the other components, such as, for instance, to the struts of the intermediate turbine housing (See FIG. 3B). Also apparent in this illustration in connection region 14 are bores 23, which are used for attaching tube bushings. Also apparent in FIG. 1 are two mounting flanges 22, 24 which, in the assembled state of a gas turbine that encompasses the intermediate turbine housing, in particular the aircraft gas turbine, rest against a corresponding counterflange of a turbine component, for instance, a high-pressure turbine or a low-pressure turbine, enabling the intermediate turbine housing and the corresponding turbine component to be secured to one another. In the illustration of FIG. 1, flange 22 may be used for connection to the low-pressure turbine and flange 24 for connection to the high-pressure turbine.

Figure 2A:
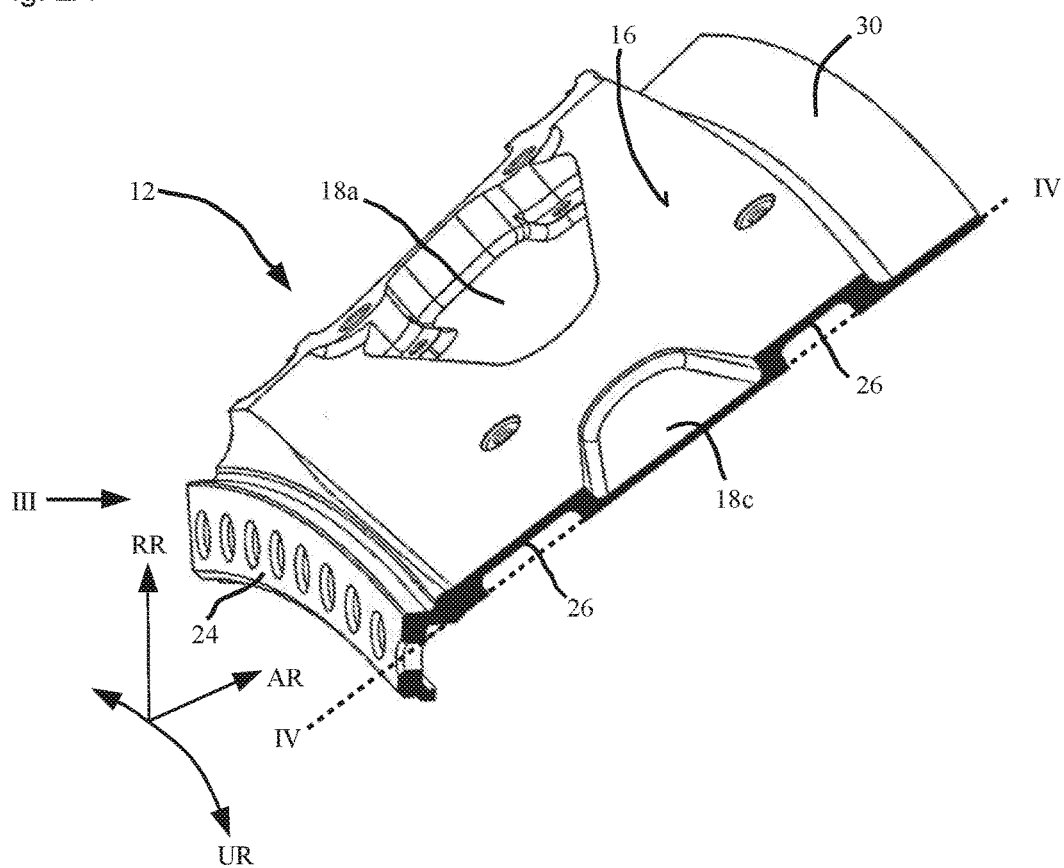
FIGS. 2A and 2B show simplified, perspective, part sectional views of the housing element of FIG. 1 in an oblique, (circumferentially) lateral plan view, externally (FIG. 2A) and internally (FIG. 2B).

FIG. 2A shows housing element 12 in a lateral, perspective part sectional view; a view of a radial outer side of housing element 12 being provided obliquely from above. Readily apparent in FIG. 2A are depressions 18a and 18c, that may also be identified in FIG. 1, in order to simplify the orientation. In longitudinal section, the lateral part sectional view of FIG. 2A shows a cross-sectional area of housing element 12 that is filled in in black. Besides depressions 18a, 18c formed in housing element 12 relative to radially outward surface 16, it is readily apparent that at least one recess 26 is also formed in housing element 12 from radially inwardly. Overlap region 30 of housing element 12, that is rearwardly disposed in axial direction AR, is a transition region to a proximate annular or conical component of the intermediate turbine housing.

Figure 2B:
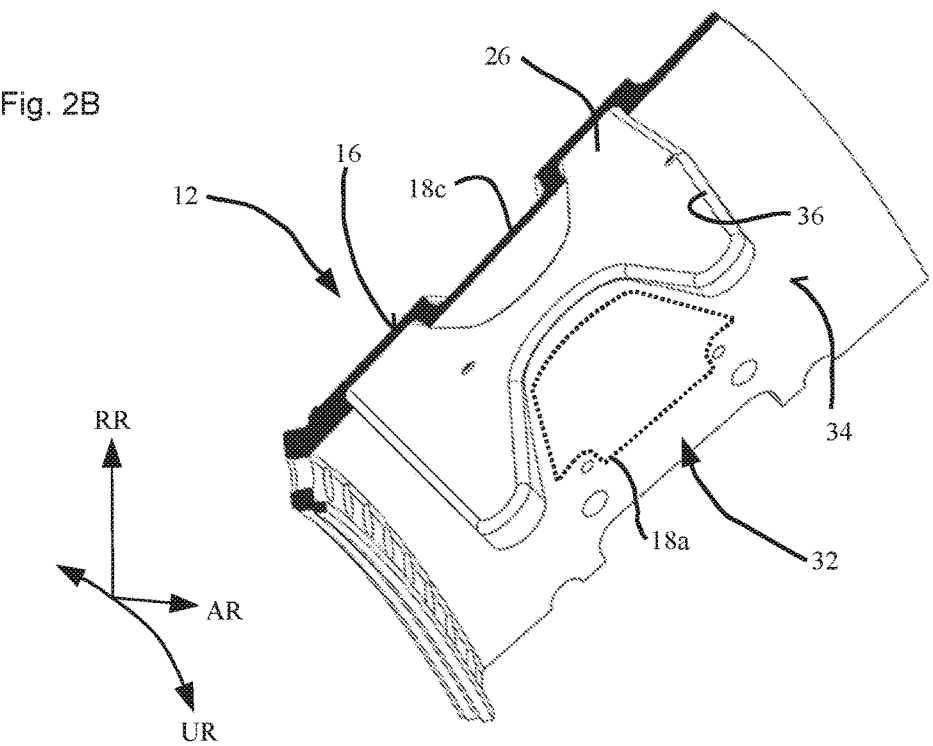

FIG. 2B shows the housing element in a lateral perspective view obliquely from below, in the direction of a radial inner side 32. Housing element 12 has a radially inwardly disposed inner surface 34. Recess 26 is configured in this inner surface 34. A stepped edge 36 forms the transition from inner surface 34 to recess 26. It is readily apparent from FIG. 2B that recess 26 is configured in regions of housing element 12 where no depression 18a, 18c is formed radially outwardly; due to the selected direction of view, depression 18a not being evident in the illustration of FIG. 2B, but the position thereof on radial outer side 16 being indicated by a dotted line.

FIG. 3A shows housing element 12 in a frontal, perspective part sectional view that corresponds approximately to the direction of view indicated by arrow III from FIG. 2A. It is readily apparent from FIG. 3A that housing element 12 is received or installed between two connection regions 14. Accordingly, the housing element is also configured between two respective struts that essentially extend radially inwardly from the connection regions (toward the center of the intermediate turbine housing). On the other hand, the two depressions 18a and 18c and radial outer surface 16 are evident. Radially inwardly formed recess 26 is evident, in turn, from the sectional surface (shown in black) of a cross section through housing element 12. The form thereof is not apparent due to the direction of view, but is indicated by the dotted line.

FIG. 3B shows housing element 12 of FIG. 3A obliquely from below, thereby providing the view of recess 26 and inner surface 34 of housing element 12. FIG. 3B shows a center axis MA of recess 26. This center axis extends in the longitudinal direction of recess 26 and is disposed in a plane spanned by the radial and axial directions. Recess 26 is preferably configured symmetrically to center axis MA. Taking length L, which coincides with center axis MA, as a basis for recess 26, recess 26 features a width B that is orthogonal to this length L, respectively to center axis MA. Width B of recess 26 varies along length L, width B preferably varying continuously. Width B may have a smallest value in a longitudinal region LB that corresponds approximately to 20% of length L of recess 26; this region preferably encompassing position LM of half of the length, respectively of the middle of the length. In other words, based on length L thereof, recess 26 features a middle region 38 that is constricted or narrowed relative to a front region 40 and rear region 42 contiguous thereto in longitudinal direction L. Stepped edge 36 forms a circumferential contour of recess 26, this circumferential contour being formed by linear circumferential portions 44 and arcuate circumferential portions 46 of recess 26. Depressions 18a and 18c, that are not visible and are formed on radial outer surface 16, are also indicated by dotted lines in FIG. 3B. It is hereby apparent that recess 26 is configured outside of the regions in which depressions 18a, 18c are formed on radial outer surface 16.

It is also not possible that recess 26 in FIG. 3B be formed to be through-extending. In particular, instead of one recess 26, a plurality of recesses may be formed. It is conceivable, for example, that middle region 38 not be recessed, rather that it have the usual material thickness, thereby resulting in two axially successive recesses. It is also conceivable that these two recesses again have regions along center axis MA that are not recessed; hereby making it possible for there to be altogether four recesses that are separated from one another in the middle region and in the axial direction along center axis MA. In such a case of four recesses, for example, two recesses may be symmetrically formed relative to center axis MA (to the left and right of the center axis). Struts 100 and 102 are shown schematically.

Figure 4A:
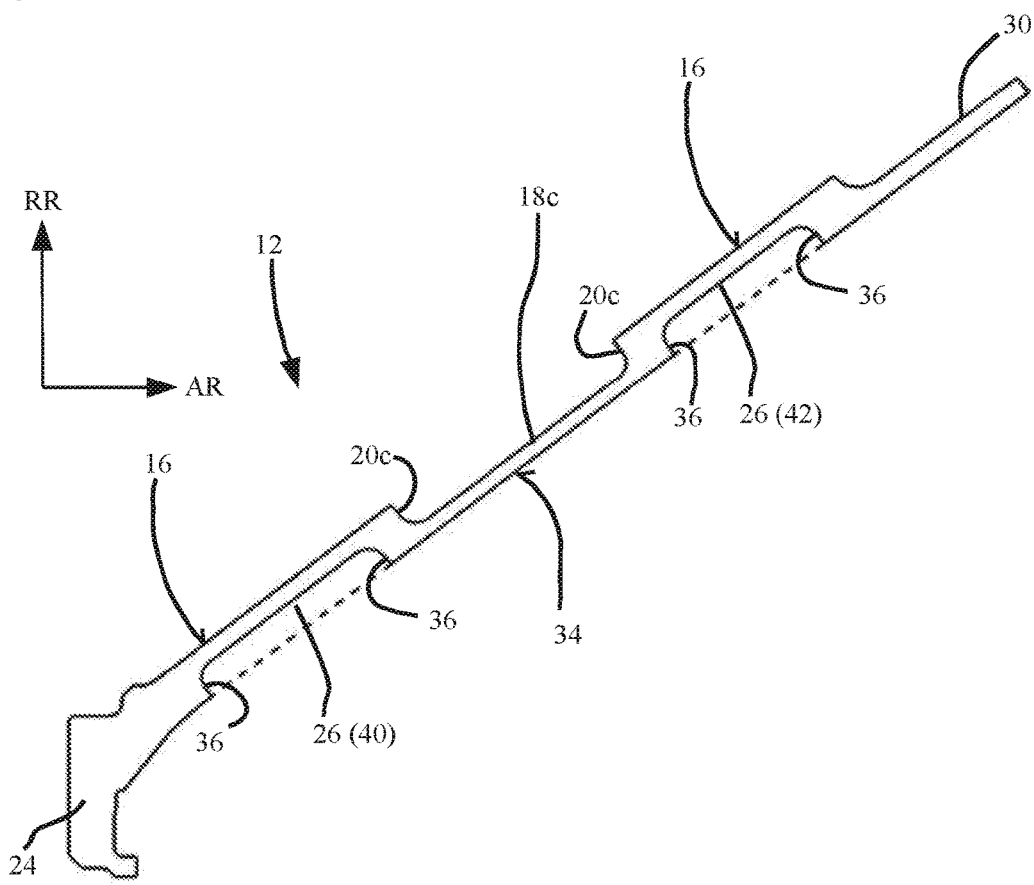
FIG. 4A shows a sectional view along line of intersection IV-IV of FIG. 3A, respectively FIG. 2A and, FIG. 4B, a sectional view along line of intersection V-V of FIG. 3B.

FIG. 4A shows a simplified sectional view as a longitudinal section through housing element 12 that corresponds approximately to line of intersection IV-IV of FIG. 2A and FIG. 3A. The illustrated section shows approximately the same cross-sectional area as that filled in in black in FIG. 2A. Again apparent in FIG. 4A is depression 18c that is formed in radial outer surface 16. In addition, FIG. 3A shows recess 26 having the two recess regions 40 and 42. For the sake of completeness, reference is also made to flange portion 24 and to overlap region 30 of housing element 12. A dotted line drawn in the area of recess 26 indicates the full profile of housing element 12 known from the related art. It is again noted here that recess 26 is only formed in regions where no depressions 18c are provided on radial outer surface 16.

In comparison with the full profile (dotted line) indicated in FIG. 4A, recess 26 makes it possible to economize on weight for each housing element 12. In addition, the circumferential portions, respectively stepped edge 36, in particular also in cooperation with stepped edges 20c, function as reinforcing ribs for planar housing element 12, thereby making it possible to achieve an optimal stress profile while at the same time reducing weight in housing element 12.

Figure 4B:
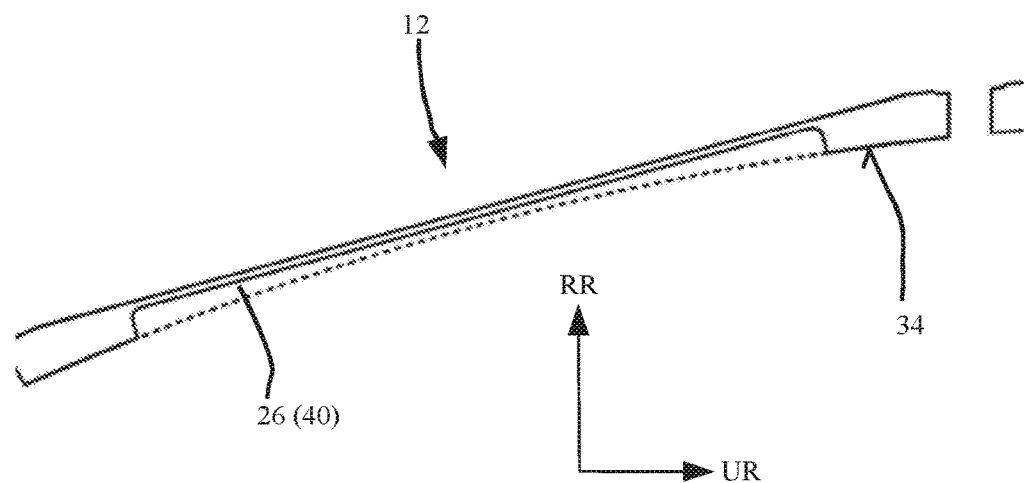

FIG. 4B again shows a section along line of intersection V-V of FIG. 3B. Readily apparent is recess 26 formed in radial inner surface 34, in particular recess region 40 thereof. Also drawn in this illustration as a dotted line is the known full profile of housing element 12, making it at least qualitatively apparent how much material is missing in comparison to a conventional full profile, based on the cross-sectional area through recess 26.

The weight of each housing element 12 may be significantly reduced by providing a radially inner recess 26. This is associated with a lower specific fuel consumption when weight-reducing housing elements 12 are installed in an intermediate turbine housing of a gas turbine, in particular aircraft gas turbine.

REFERENCE NUMERAL LIST 10 intermediate turbine housing
12 housing element
14 connection region
16 radial outer surface
18a, c, d depression
20a, c, d stepped edge
21 bolt connection
22 connection flange
23 bore
24 connection flange
26 recess
30 overlap region
32 radial inner surface
34 inner surface
36 stepped edge
38 middle region
40 front region
42 rear region
44 linear circumferential portion
46 arcuate circumferential portion
100,102 struts
B width of the recess
L length of the recess
MA center axis of the recess
LB longitudinal region
LM middle of the length
AR axial direction
RR radial direction
UR circumferential direction

What is claimed is:

1. A housing element for an intermediate turbine housing of a gas turbine, the housing element being installable or installed in the intermediate turbine housing radially outwardly in each case between two of a plurality of struts that are spaced in circumferential direction, the housing element being planar and comprising:
a radial outer side and a radially inner side;
a plurality of depressions relative to the radial outer side and defining depression regions on the radial outer side;
at least one recess on the radial inner side configured outside of the depression regions.

2. The housing element as recited in claim 1 wherein the depressions are configured to allow a plurality of surfaces to be formed on different levels in the housing element and joined together via stepped edges.

3. The housing element as recited in claim 1 wherein, on the radial inner side, the recess has a circumferential contour configured, at least in portions thereof, to complement a circumferential contour of one of the depressions formed on the radial outer side.

4. The housing element as recited in claim 3 wherein the circumferential contour of the recess includes a plurality of contour portions merging into one another, the contour portions having a linear or arcuate form.

5. The housing element as recited in claim 1 wherein the recess is symmetrically shaped relative to a center axis of the housing element relative to a state when the housing element is mounted on the intermediate turbine housing.

6. The housing element as recited in claim 5 wherein the center axis is disposed in the circumferential direction in the middle between two struts of the intermediate turbine housing.

7. The housing element as recited in claim 5 wherein, in a width direction orthogonal to the center axis, the recess has a width varying along the center axis.

8. The housing element as recited in claim 7 wherein the width varies continuously.

9. The housing element as recited in claim 7 wherein a width of the recess has a smallest value in a smallest width value region 20% of a length of the recess, the length being measured along the center axis.

10. The housing element as recited in claim 9 wherein the smallest width value region is configured to include the position of half of the length.

11. The housing element as recited in claim 1 wherein the at least one recess includes a plurality of recesses symmetrically disposed relative to a center axis of the housing element, relative to a state when the housing element is mounted on the intermediate turbine housing.

12. The housing element as recited in claim 11 wherein the center axis is disposed in the circumferential direction in the middle between the two struts of the intermediate turbine housing.

13. An intermediate turbine housing of a gas turbine comprising:
   a plurality of struts spaced in the circumferential direction and extend in the radial direction through a hot gas-conducting annular chamber in a way that allows the struts to support at least one radially inner hub portion for receiving at least one shaft of the gas turbine; and
   a housing element as recited in claim 1 and installed between two of the plurality struts along the outer circumference of the intermediate turbine housing.

14. A gas turbine comprising: the intermediate turbine housing as recited in claim 13.

15. The gas turbine as recited in claim 14 wherein the intermediate turbine housing is configured between a high-pressure turbine and a low-pressure turbine, or between a high-pressure turbine and a medium-pressure turbine, or between a medium-pressure turbine and a low-pressure turbine.

16. An aircraft gas turbine comprising the gas turbine as recited in claim 14.

* * * * *